(12) United States Patent
Mankame

(10) Patent No.: US 11,354,986 B2
(45) Date of Patent: Jun. 7, 2022

(54) HAPTIC DEVICE WITH VIBRATION MOTOR AND SEAT ASSEMBLY

(71) Applicant: GM GLOBAL TECHNOLOGY OPERATIONS LLC, Detroit, MI (US)

(72) Inventor: Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 16/774,698

(22) Filed: Jan. 28, 2020

(65) Prior Publication Data

US 2021/0233368 A1 Jul. 29, 2021

(51) Int. Cl.
*G08B 6/00* (2006.01)
*B60N 2/90* (2018.01)
*F16F 15/04* (2006.01)

(52) U.S. Cl.
CPC .............. *G08B 6/00* (2013.01); *B60N 2/90* (2018.02); *F16F 15/04* (2013.01); *B60N 2002/981* (2018.02); *F16F 2224/0225* (2013.01)

(58) Field of Classification Search
CPC ...... G08B 6/00; B60N 2/90; B60N 2002/981; F16F 15/04; F16F 2224/0225
See application file for complete search history.

(56) References Cited

U.S. PATENT DOCUMENTS

| 9,978,226 | B1 | 5/2018 | Mankame et al. | |
|---|---|---|---|---|
| 10,513,211 | B2 | 12/2019 | Mankame et al. | |
| 2010/0013613 | A1* | 1/2010 | Weston | G06F 3/041 340/407.2 |
| 2020/0184822 | A1* | 6/2020 | Fukuda | B60R 21/00 |

* cited by examiner

*Primary Examiner* — Joseph H Feild
*Assistant Examiner* — Sharmin Akhter
(74) *Attorney, Agent, or Firm* — Quinn IP Law

(57) ABSTRACT

Disclosed herein is a haptic device having at least one vibration motor, such as a linear vibration motor, configured to selectively generate a vibration at least partially along an actuator axis. An interfacing plate is configured to transmit the vibration and is at least partially composed of a compliant material. The linear vibration motor and the interfacing plate are embedded in a host. The host defines a first surface with a recessed zone extending from the first surface. The interfacing plate is configured to fit in the recessed zone. The host includes a chamber contiguous with the recessed zone, with the linear vibration motor being positioned in the chamber. The chamber may include respective walls having a plurality of protrusions configured to at least partially absorb the vibration. The haptic device may be part of a seat assembly.

18 Claims, 3 Drawing Sheets

HAPTIC DEVICE WITH VIBRATION MOTOR AND SEAT ASSEMBLY

INTRODUCTION

The disclosure relates generally to a haptic device with at least one vibration motor and a seat assembly having the same. The functionality of an apparatus may be enhanced by augmenting an operator's sense of hearing and sight with their sense of touch. Haptic devices include elements that produce mechanical vibrations, which are intended to be felt by a user of the device as an alert or feedback mechanism. The vibration may be generated, for example, by an unbalanced eccentric mass attached to a shaft of an electric motor. However, a device producing a sufficiently discernable vibration may interfere with the comfort of a seat occupant.

SUMMARY

Disclosed herein is a haptic device having at least one vibration motor ("at least one" omitted henceforth) configured to selectively generate a vibration at least partially along an actuator axis. An interfacing plate is operatively connected to and configured to transmit the vibration away from the vibration motor. The interfacing plate is at least partially composed of a compliant material. The vibration motor and the interfacing plate are embedded in a host. The host defines a first surface with a recessed zone extending from the first surface. The interfacing plate is configured to fit in the recessed zone. The host includes a chamber contiguous with the recessed zone, with the vibration motor being positioned in the chamber.

Also disclosed is a seat assembly with a haptic device having at least one vibration motor configured to selectively generate a vibration at least partially along an actuator axis. An interfacing plate is operatively connected to and configured to transmit the vibration away from the vibration motor. The interfacing plate is at least partially composed of a compliant material. The interfacing plate is configured to fit in a recessed zone of a host. The host defines a first surface with the recessed zone extending from the first surface. The host includes a chamber contiguous with the recessed zone, with the vibration motor being positioned in the chamber. The host is at least partially a portion of at least one of a seat bottom, a seat back and a head rest.

The vibration motor may be a linear vibration motor. The vibration motor defines a motor boundary along a reference plane. The interfacing plate defines a plate boundary along the reference plane. The plate boundary is configured to be greater than the motor boundary such that a perimeter region wraps around the vibration motor.

A padding layer may be in direct communication with the interfacing plate such that the interfacing plate is sandwiched between the vibration motor and the padding layer. The padding layer is configured to fit in the recessed zone of the host. An outer layer may be in direct communication with the padding layer. In one example, the host is at least partially composed of foam.

The chamber may include respective walls having a plurality of protrusions configured to at least partially absorb the vibration. In one example, the plurality of protrusions have a substantially sinusoidal shape. In another example, the plurality of protrusions may have a substantially sawtooth shape. The chamber may be at least partially filled with an acoustic absorbing material. In one example, the thickness of the linear vibration motor along a normal axis is less than or equal to 6 mm. The vibration motor may be configured to have a resonant frequency in a range between 50 and 200 Hz, inclusive.

A controller may be in communication with the vibration motor and configured to transmit a control command having one or more pulses defining a respective pulse duration, a respective pulse amplitude and a respective spacing between the one or more pulses. The controller is configured to selectively modulate at least one of the respective pulse duration, the respective pulse amplitude and the respective spacing.

In one embodiment, a haptic device includes at least one linear vibration motor configured to selectively generate a vibration at least partially along an actuator axis. An interfacing plate is operatively connected to and configured to transmit the vibration away from the at least one linear vibration motor, the interfacing plate being at least partially composed of a compliant material. A padding layer is in direct communication with the interfacing plate such that the interfacing plate is sandwiched between the at least one linear vibration motor and the padding layer. A host defines a first surface and has a recessed zone extending from the first surface. The interfacing plate and the padding layer are configured to fit in the recessed zone. The host includes a chamber contiguous with the recessed zone, the at least one linear vibration motor being positioned in the chamber. The chamber includes respective walls having a plurality of protrusions configured to at least partially absorb the vibration. The at least one linear vibration motor and the interfacing plate respectively define a motor boundary and a plate boundary along a reference plane. The plate boundary is configured to be greater than the motor boundary such that a perimeter region wraps around the at least one linear vibration motor.

The above features and advantages and other features and advantages of the present disclosure are readily apparent from the following detailed description of the best modes for carrying out the disclosure when taken in connection with the accompanying drawings.

DETAILED DESCRIPTION

Figure 1:
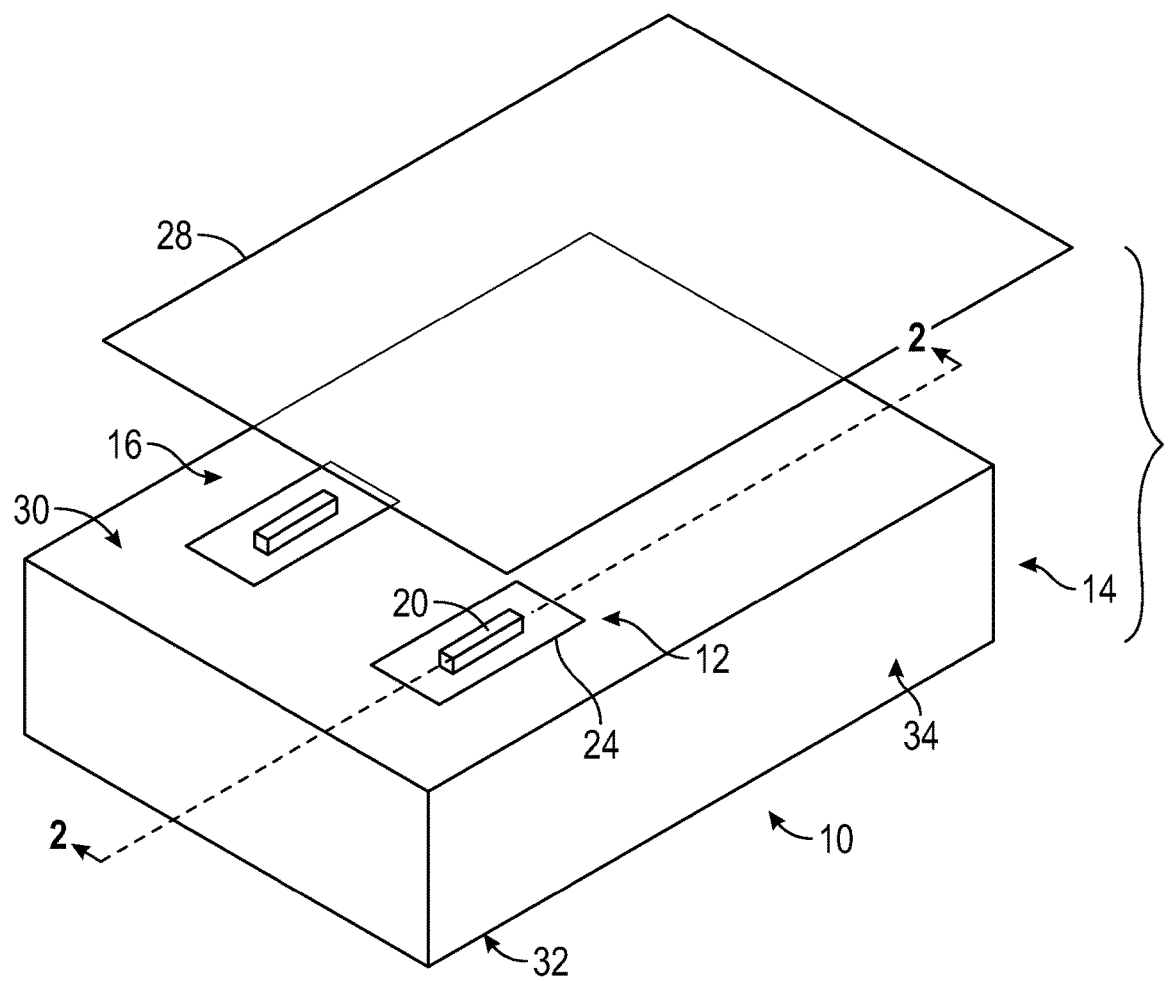
FIG. 1 is a schematic perspective view of an example haptic device having at least one haptic unit embedded in a host.

Referring to the FIGS., wherein like reference numbers refer to the same or similar components throughout the several views, FIG. 1 is a schematic partially perspective, partially exploded view of a haptic device 10 having at least one haptic unit 12 ("at least one" omitted henceforth) embedded in a host 14. The haptic device 10 may include multiple haptic units embedded in the host 14, such as second haptic unit 16 shown in FIG. 1. The number of haptic units may be varied based on the application at hand.

The haptic device 10 may be incorporated in a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, plane and train. The haptic device 10 may be incorporated in a non-mobile platform, such as for example, a theater seat, a gaming seat, a seat for an operator who controls complex machinery and an air traffic controller seat.

Figure 2:
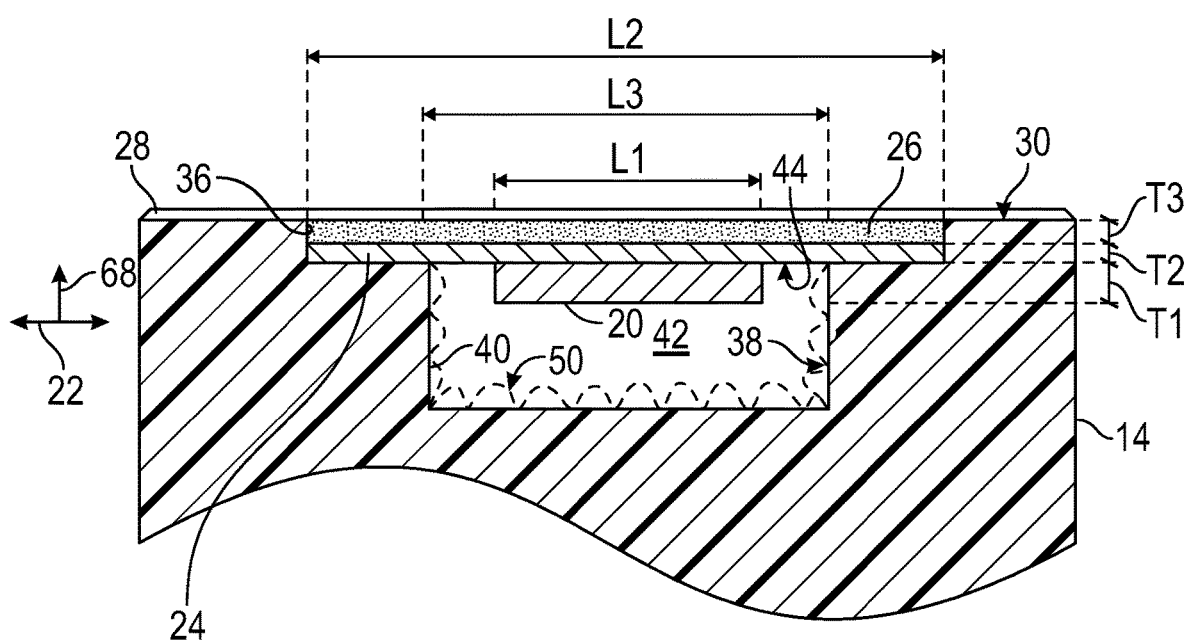
FIG. 2 is a schematic fragmentary cross-sectional view of the haptic device, taken along axis 2-2 of FIG. 1.

FIG. 2 is a schematic fragmentary sectional view of the haptic device 10, taken along axis 2-2 of FIG. 1. Referring to FIGS. 1-2, the haptic unit 12 includes at least one vibration motor 20, such as a linear vibration motor 20, configured to selectively generate a vibration at least partially along an actuator axis 22. Referring to FIGS. 1-2, an interfacing plate 24 is operatively connected to and configured to transmit the vibration away from the linear vibration motor 20. The linear vibration motor 20 generates a vibration that is at least partially aligned with the actuator axis 22. However, the interfacing plate 24, the host 14, the occupant and the interaction of these, especially at their respective interfaces, may result in the vibration energy being transmitted in multiple directions soon after it leaves the interfacing plate 24. The direction of propagation of the energy changes depending on the boundary conditions on the interfacing plate 24, the relative moduli of the interfacing plate 24, the host 14, the occupant and other factors.

As described herein, the haptic device 10 allows for a relative reduction in mass, packaging ease, improved comfort, lower power consumption and enabling of more sophisticated alert functionality. The haptic device 10 may be packaged in a seat assembly 100 (shown in FIG. 4) to provide alert functionality, for example, distinguishing between front-left and back-left impact events. The interfacing plate 24 may be at least partially composed of a compliant material to mitigate impact on comfort for a seat occupant, in other words, reducing hard edges or protrusions on the seat assembly 100 incorporating the haptic device 10.

Referring to FIG. 2, a padding layer 26 in direct communication with the interfacing plate 24 such that the interfacing plate 24 is sandwiched between the linear vibration motor 20 and the padding layer 26. Referring to FIG. 2, an outer layer 28 (shown in FIG. 1 as well) is in direct communication with the padding layer 26. The outer layer 28 may be composed of a polymer or leather material. The host 14 may be composed of closed-cell foam or other materials. It is understood that the haptic device 10 may take many different forms and include multiple and/or alternate components and facilities.

Referring to FIG. 1, the host 14 defines a first surface 30, a second surface 32 and side walls 34. The strength of the vibration is dictated by the desired intensity received at the first surface 30. In other words, the vibration is configured to have sufficient intensity to be discernable by a user in contact with the first surface 30. Referring to FIG. 2, the host 14 includes a recessed zone 36 extending from the first surface 30. The host 14 defines a chamber 38 contiguous with the recessed zone 36, with the linear vibration motor 20 being positioned in the chamber 38. As shown in FIG. 2, the interfacing plate 24 and the padding layer 26 may be configured to fit snugly in the recessed zone 36.

Referring to FIG. 2, the chamber 38 defines respective walls 40 and may be at least partially filled with an acoustic absorbing material 42. For example, the acoustic absorbing material 42 may be goose down, felt, foam or other suitable material. The composition of the acoustic absorbing material 42 may be varied based on the application at hand.

Figure 3:
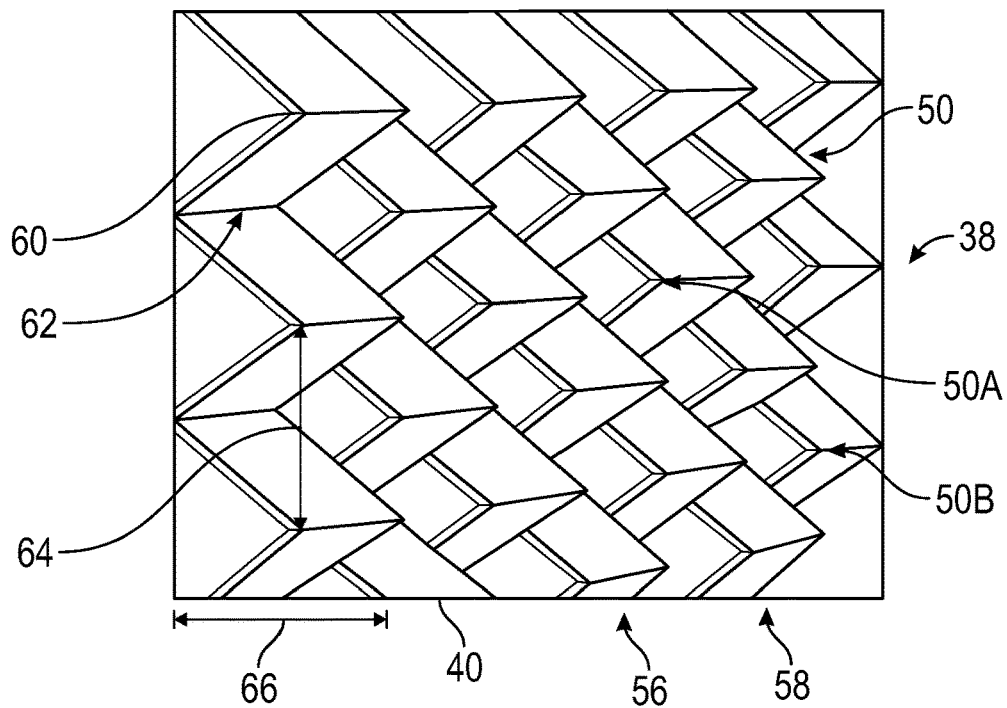
FIG. 3 is a schematic fragmentary perspective view of an example wall for a chamber in the host of FIG. 1.

Referring to FIG. 2, the respective walls 40 may include a plurality of protrusions 50 configured to at least partially absorb the vibration. Referring now to FIG. 3, an example construction of the respective walls 40 of the chamber 38 in the host 14 is shown. The respective walls 40 may be integrally formed with the plurality of protrusions. Alternatively, the respective walls 40 may be flat and filled with a lining incorporating the plurality of protrusions 50. The plurality of protrusions 50 may be arranged in rows, such as first protrusions 50A in first row 56 and second protrusions 50B in second row 58, for absorbing the acoustic signal. In the example shown in FIG. 2, the plurality of protrusions 50 have a substantially sinusoidal shape. In the example shown in FIG. 3, the plurality of protrusions 50 have a substantially saw-tooth shape or wedge/pyramidal shape. Referring to FIG. 3, the shape of the plurality of protrusions 50 as well as the number of respective peaks 60, respective valleys 62, respective spacing 64 and respective height 66, may be selected to modulate the absorption requirements.

Referring to FIG. 2, the linear vibration motor 20, the interfacing plate 24 and the padding layer 26 respectively define a first thickness T1, a second thickness T2 and a third thickness T3, along the normal axis 68. In one example, the first thickness T1 of the linear vibration motor 20 is less than or equal to 6 mm. The interfacing plate 24 may be configured to have a relatively high axial stiffness and be relatively flexible in bending stiffness. In one example, the interfacing plate 24 is composed of a steel plate with the second thickness T2 being approximately 0.1 mm. In another example, the interfacing plate 24 is composed of a polyethylene or other polymer with the second thickness T2 being between approximately 6 mm and 15 mm. It is noted that FIGS. 1 and 2 are not drawn to scale.

Referring to FIG. 2, the linear vibration motor 20 defines a first length L1. The interfacing plate 24 and the padding layer 26 define a second length L2, which is greater than the first length L1. The first length L1 of the linear vibration motor 20 may be configured to be less than a third length L3 defined by the chamber 38, thereby allowing a continuous gap 44 around the linear vibration motor 20. The linear vibration motor 20 may be shaped as a relatively thin plate and may be configured to have a length to thickness ratio (L1/T1) at or above 5. In one example, the length to thickness ratio (L1/T1) is between a range of about 5 and 50.

Figure 4:
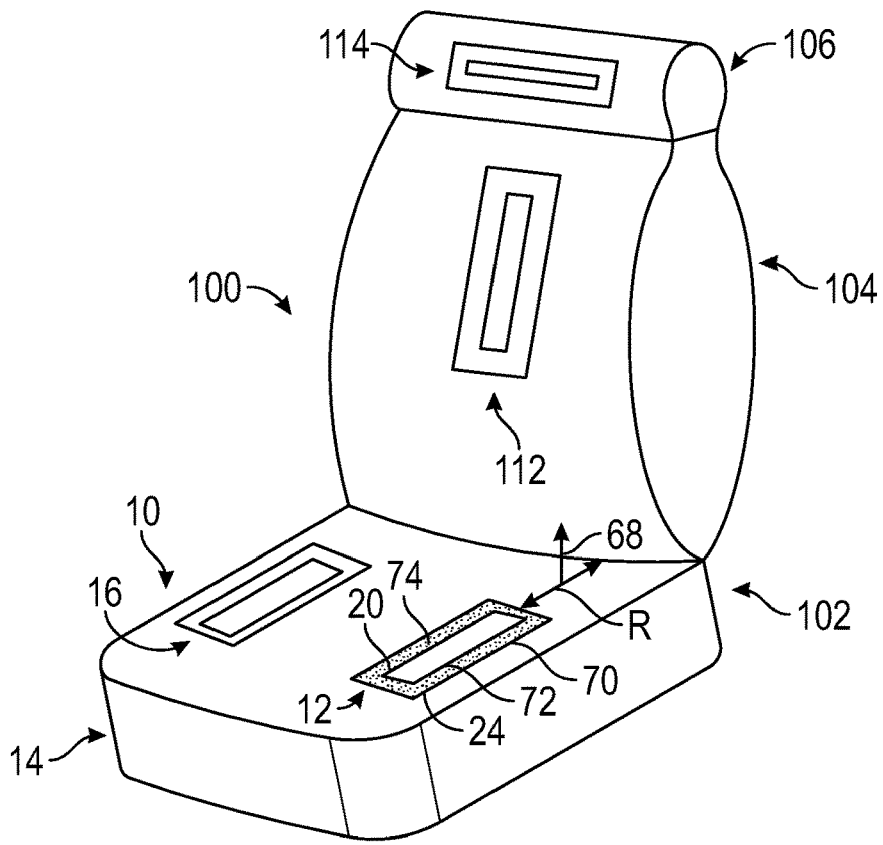
FIG. 4 is a schematic perspective view of an example seat assembly having one or more haptic devices.

Referring now to FIG. 4, the haptic device 10 may be part of a seat assembly 100. The haptic device 10 may be incorporated in at least one of a seat bottom 102 (haptic unit 12 and second haptic unit 16), a seat back 104 (third haptic unit 112) and a head rest 106 (fourth haptic unit 114) of the seat assembly 100. The respective haptic signals are configured to be discernable to an occupant (not shown) in contact with the respective exterior surfaces of the seat assembly 100. Referring to FIG. 4, the interfacing plate 24 defines a plate boundary 70 along a reference plane R. In one example, the reference plane R is substantially parallel to the actuator axis 22 and orthogonal to the normal axis 68. The linear vibration motor 20 defines an actuator boundary 72 along the reference plane R. Referring to FIG. 4, the plate boundary 70 is configured to be greater than the actuator boundary 72 such that a perimeter region 74 wraps around the linear vibration motor 20 in the reference plane R.

Figure 5:
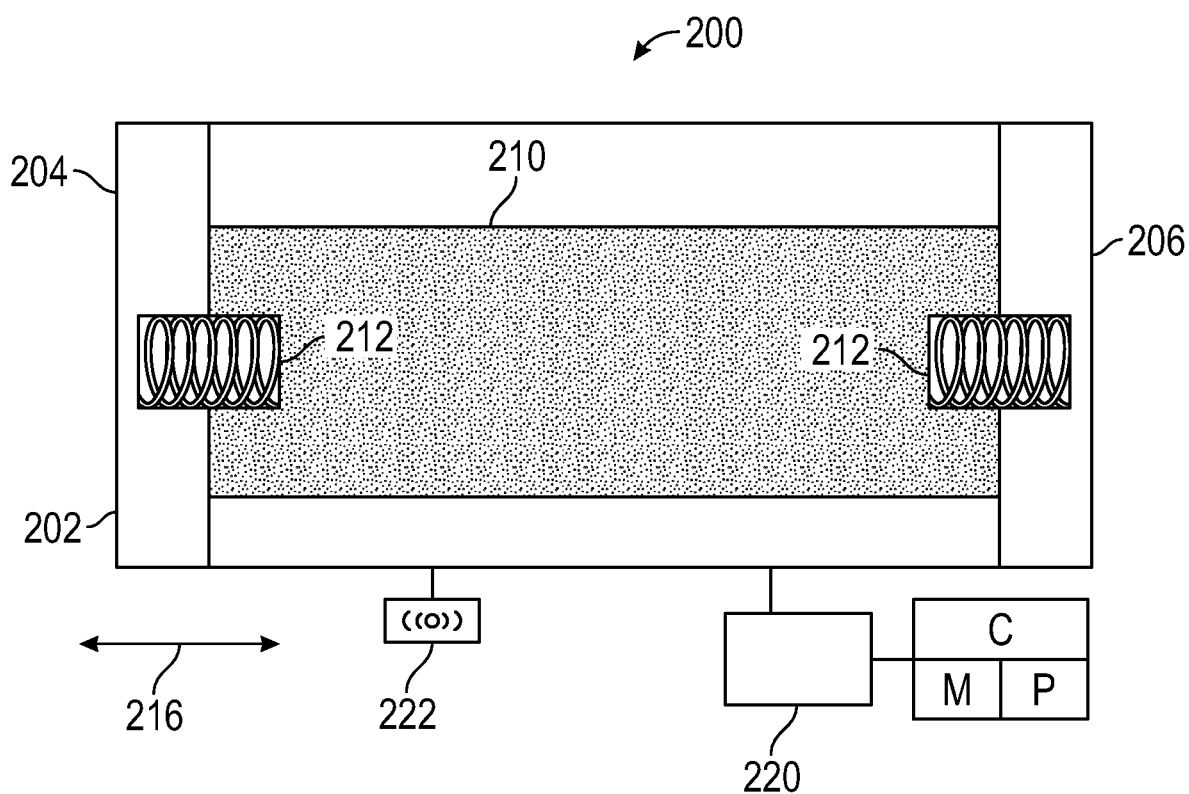
FIG. 5 is a schematic fragmentary side view of an example linear vibration motor that may be employed in the haptic device of FIG. 1.

FIG. 5 illustrates an example of a linear vibration motor 20 that may be employed in the haptic device 10 of FIG. 1. Referring to FIG. 5, the linear vibration motor 20 includes a housing 202 defining a first end 204 and a second end 206. A magnetic mass 210 (shaded in FIG. 5) may be mounted between the first end 204 and the second end 206 of the housing 202, through springs 212. Referring to FIG. 5, coils (not shown) may be positioned in proximity to the magnetic mass 210. As current is selectively flown through the coils, a magnetic field forms which interacts with the magnetic field of the magnetic mass 210, inducing movement of the magnetic mass 210 in the direction 216. The direction and polarity of current flow determines the forward and reverse movement (along direction 216) of the magnetic mass 210, with the springs 212 moving through respective compressed, expanded and neutral positions. It is understood that other suitable designs may be employed.

The linear vibration motor 20 has a resonant frequency at which it can be driven efficiently, with the vibrational strength falling off as the drive frequency moves away from the resonant frequency. The resonant frequency is characterized by the mass/weight of the magnetic mass 210 and the degree of compliance of the spring 212. The linear vibration motor 20 may be constructed to define a resonant frequency in a range between 50 and 200 Hz, inclusive. Other methods of generating the vibration may be employed. For example, the linear vibration motor 20 may include other elements such as a piezoelectric element (not shown) and/or a voice coil motor.

Referring to FIG. 5, the linear vibration motor 20 may be driven via a driver module 220, which may be connected to or embedded in a controller C. The linear vibration motor 20 may include an interfacing unit 222 for communicating with the controller C via a communication BUS, which may be in the form of a serial Controller Area Network (CAN-BUS).

Figure 6:
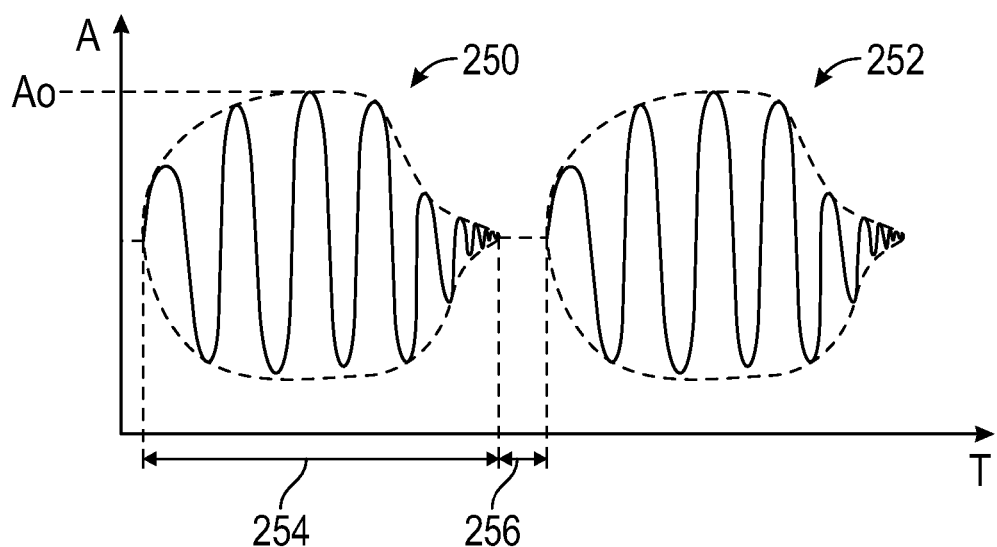
FIG. 6 is a schematic graph illustrating one or more pulses for driving the linear vibration motor of FIG. 5, with pulse amplitude shown in the vertical axis and time shown in the horizontal axis.

Referring to FIG. 5, the controller C may be in communication with the linear vibration motor 20 and configured to transmit a control command with one or more pulses for driving the linear vibration motor 20. FIG. 6 is a schematic graph illustrating examples pulses, such as first pulse 250 and second pulse 252. Pulse amplitude A is shown in the vertical axis and time T is shown in the horizontal axis. Referring to FIG. 6, the first pulse 250 defines a respective pulse duration 254, a respective pulse amplitude Ao and a respective spacing 256 between the first pulse 250 and the second pulse 252. The haptic device 10 may be configured to generate a plurality of vibrational tones.

The controller C may include at least one processor P and at least one memory M (or other non-transitory, tangible computer readable storage medium) on which are recorded instructions for when to issue the respective command signals. The memory M can store controller-executable instruction sets, and the processor P can execute the controller-executable instruction sets stored in the memory M. For example, if the platform is a vehicle, the respective command signals may be issued and the respective vibrations activated after a turn signal indicator has been turned on for greater than a threshold time in order to alert the driver of this condition. Referring to FIGS. 5 and 6, the controller C may be configured to selectively modulate at least one of the respective pulse duration 254, the respective pulse amplitude Ao and the respective spacing 256 to create distinct types of vibrational tones. For example, separate vibrational tones may be employed for different types of alert, such as lane departure alerts, seat belt alerts and turn signal alerts.

In summary, the haptic device 10 allows for a relative reduction in mass, packaging ease, improved comfort, lower power consumption and enabling of more sophisticated alert functionality. The haptic device 10 incorporates a relatively thin profile and a compliant interfacing plate 24 to mitigate impact on comfort for an operator, in other words, reducing hard edges or protrusions on the seat assembly 100 (shown in FIG. 4).

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A haptic device comprising:
at least one vibration motor configured to selectively generate a vibration at least partially along an actuator axis;
an interfacing plate operatively connected to and configured to transmit the vibration away from the at least one vibration motor, the interfacing plate being at least partially composed of a compliant material;
a host defining a first surface and having a recessed zone extending from the first surface, the interfacing plate being configured to fit in the recessed zone;
wherein the host includes a chamber contiguous with the recessed zone, the at least one vibration motor being positioned in the chamber; and
wherein the chamber includes respective walls having a plurality of protrusions configured to at least partially absorb the vibration, the plurality of protrusions having a substantially sinusoidal shape.

2. The haptic device of claim 1, wherein:
the at least one vibration motor is a linear vibration motor defining a motor boundary along a reference plane;
the interfacing plate defines a plate boundary along the reference plane; and
the plate boundary is configured to be greater than the motor boundary such that a perimeter region wraps around the linear vibration motor.

3. The haptic device of claim 2, further comprising:
a padding layer in direct communication with the interfacing plate such that the interfacing plate is sandwiched between the linear vibration motor and the padding layer; and
wherein the padding layer is configured to fit in the recessed zone of the host.

4. The haptic device of claim 3, further comprising:
an outer layer in direct communication with the padding layer; and
wherein the host is at least partially composed of foam.

5. The haptic device of claim 1, wherein: the plurality of protrusions having a substantially saw-tooth shape.

6. The haptic device of claim 1, wherein:
the chamber is at least partially filled with an acoustic absorbing material.

7. The haptic device of claim 1, wherein:
a thickness of the at least one vibration motor along a normal axis is less than or equal to 6 mm.

8. The haptic device of claim 1, wherein:
the at least one vibration motor is configured to have a resonant frequency in a range between 50 and 200 Hz, inclusive.

9. The haptic device of claim 1, further comprising:
a controller in communication with the at least one vibration motor and configured to transmit a control command having one or more pulses defining a respective pulse duration, a respective pulse amplitude and a respective spacing between the one or more pulses; and
wherein the controller is configured to selectively modulate at least one of the respective pulse duration, the respective pulse amplitude and the respective spacing.

10. A seat assembly comprising:
at least one vibration motor configured to selectively generate a vibration at least partially along an actuator axis;
an interfacing plate operatively connected to and configured to transmit the vibration away from the at least one vibration motor, the interfacing plate being at least partially composed of a compliant material;
a host defining a first surface and having a recessed zone extending from the first surface, the interfacing plate being configured to fit in the recessed zone;
wherein the host includes a chamber contiguous with the recessed zone, the at least one vibration motor being positioned in the chamber;
wherein the chamber includes respective walls having a plurality of protrusions configured to at least partially absorb the vibration, the plurality of protrusions having a substantially saw-tooth shape; and
wherein the host is at least partially a portion of at least one of a seat bottom, a seat back and a head rest.

11. The seat assembly of claim 10, wherein:
the at least one vibration motor is a linear vibration motor defining a motor boundary along a reference plane parallel to the actuator axis;
the interfacing plate defines a plate boundary along the reference plane; and
the plate boundary is configured to be greater than the motor boundary such that a perimeter region wraps around the at least one vibration motor.

12. The seat assembly of claim 10, further comprising:
a padding layer in direct communication with the interfacing plate such that the interfacing plate is sandwiched between the at least one linear vibration motor and the padding layer;
wherein the padding layer is configured to fit in the recessed zone of the host;
an outer layer in direct communication with the padding layer; and
wherein the host is at least partially composed of foam.

13. The seat assembly of claim 10, wherein: the plurality of protrusions having a substantially sinusoidal shape.

14. The seat assembly of claim 10, wherein:
the chamber is at least partially filled with an acoustic absorbing material.

15. The seat assembly of claim 10, wherein:
a thickness of the at least one vibration motor along the actuator axis is less than or equal to 6 mm.

16. The seat assembly of claim 10, wherein:
the at least one vibration motor is configured to have a resonant frequency in a range between 50 and 200 Hz, inclusive.

17. The seat assembly of claim 10, further comprising:
a controller in communication with the at least one vibration motor and configured to transmit a control command having one or more pulses defining a respective pulse duration, a respective pulse amplitude and a respective spacing between the one or more pulses; and
wherein the controller is configured to selectively modulate at least one of the respective pulse duration, the respective pulse amplitude and the respective spacing.

18. A haptic device comprising:
at least one linear vibration motor configured to selectively generate a vibration at least partially along an actuator axis;
an interfacing plate operatively connected to and configured to transmit the vibration away from the at least one linear vibration motor, the interfacing plate being at least partially composed of a compliant material;
a padding layer in direct communication with the interfacing plate such that the interfacing plate is sandwiched between the at least one linear vibration motor and the padding layer;
a host defining a first surface and having a recessed zone extending from the first surface, the interfacing plate and the padding layer being configured to fit in the recessed zone;
wherein the host includes a chamber contiguous with the recessed zone, the at least one linear vibration motor being positioned in the chamber;
wherein the chamber includes respective walls having a plurality of protrusions configured to at least partially absorb the vibration, the plurality of protrusions having a substantially saw-tooth shape;
wherein the at least one linear vibration motor and the interfacing plate respectively define a motor boundary and a plate boundary along a reference plane;
and wherein the plate boundary is configured to be greater than the motor boundary such that a perimeter region wraps around the at least one linear vibration motor.

* * * * *